UNITED STATES PATENT OFFICE.

ROMEO NACIMENTO, OF SAN FRANCISCO, CALIFORNIA.

PROCESS OF MAKING LEAVEN.

1,380,828. Specification of Letters Patent. Patented June 7, 1921.

No Drawing. Application filed December 20, 1917. Serial No. 208,069.

*To all whom it may concern:*

Be it known that I, ROMEO NACIMENTO, a citizen of the United States, and a resident of the city and county of San Francisco and State of California, have invented a certain new and useful Process of Making Leaven, of which the following is a specification.

The invention relates to a process of making leaven and particularly to a process of making liquid leaven.

An object of the invention is to provide a process for making liquid leaven that will keep and retain its qualities for long periods of time.

The invention possesses other advantageous features, some of which, with the foregoing, will be set forth at length in the following description where I shall outline in full the process of my invention.

In accordance with my invention, I employ only potato peelings, preferably from new potatoes, instead of whole potatoes, so that the peeled potatoes may be used for making Saratoga chips or other potato products. The leaven produced by my process is liquid in form and will keep for at least six months without losing its strength. When desirable it may be frozen into solid blocks and preserved in that manner for long periods of time.

Instead of using fresh water in the preparation of my leaven, I use sea water and I attribute the keeping qualities of the leaven to the ingredients contained in the sea water. The principal ingredients used in the manufacture of the leaven are potato peelings and hops. In preparing a batch of ten gallons of leaven, I proceed as follows. I boil about two pounds of clean potato peelings in sea water for about twenty-five minutes and boil about one-fourth pound of hops in sea water a sufficient length of time to thoroughly cook the hops. The amount of water used for cooking the potatoes and the hops is five gallons, the greater proportion of this amount being used on the hops. When the potatoes are cooked, I mash and mix the skins with a mixture of three pounds of sugar and about five cupfuls of wheat flour. When this mass has been thoroughly mashed and mixed, I add the hops and the hop water and mix them into the mash. To this mixture I add four ounces of cream of tartar and six ounces of carbonate of soda dissolved in warm sea water. When this has been mixed into the mass, I add five gallons of cold sea water to reduce the temperature of the mixture. The mixture is then set aside and allowed to raise for about ten hours, when the leaven is finished and may be placed in cans or jars or may be frozen into blocks, as desired. In making bread the leaven may be used without other added liquid.

I claim:

The method of making a leavening substance which consists of boiling about two pounds of potato peelings in sea water for about twenty-five minutes; thoroughly boiling about one-fourth pound of hops separately; mashing the skins and thoroughly mixing therewith about three pounds of sugar and about three cupfuls of wheat flour; mixing with the mass the hops and hop water; mixing cream of tartar and carbonate of soda with the mass; reducing the temperature by adding sea water, and then setting the substance to raise.

In testimony whereof, I have hereunto set my hand at San Francisco, California, this 4th day of December, 1917.

ROMEO NACIMENTO.

In presence of—
H. G. PROST.